US008315852B2

(12) United States Patent
Ogawa

(10) Patent No.: US 8,315,852 B2
(45) Date of Patent: Nov. 20, 2012

(54) ELECTRONIC EQUIPMENT EQUIPPED WITH DICTIONARY FUNCTION

(75) Inventor: Muneyuki Ogawa, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 862 days.

(21) Appl. No.: 12/125,292

(22) Filed: May 22, 2008

(65) Prior Publication Data

US 2008/0306731 A1    Dec. 11, 2008

(30) Foreign Application Priority Data

Jun. 7, 2007   (JP) ................. 2007-151522

(51) Int. Cl.
*G06F 17/21*   (2006.01)
*G06F 17/28*   (2006.01)

(52) U.S. Cl. ................ 704/10; 704/2; 704/3; 704/7
(58) Field of Classification Search .................. None
See application file for complete search history.

(56) References Cited

U.S. PATENT DOCUMENTS

| | | | | |
|---|---|---|---|---|
| 4,489,396 | A * | 12/1984 | Hashimoto et al. ............... | 704/3 |
| 4,608,665 | A * | 8/1986 | Yoshida ............................ | 704/3 |
| 4,758,977 | A * | 7/1988 | Morimoto et al. ................ | 704/3 |
| 4,890,230 | A * | 12/1989 | Tanoshima et al. .............. | 704/3 |
| 5,995,922 | A * | 11/1999 | Penteroudakis et al. ......... | 704/9 |
| 6,288,732 | B1 * | 9/2001 | Moriwaki ......................... | 715/769 |
| 7,089,493 | B2 * | 8/2006 | Hatori et al. ..................... | 715/259 |

FOREIGN PATENT DOCUMENTS

| | | | |
|---|---|---|---|
| JP | 10-116288 A | | 5/1998 |
| JP | 2004-302663 A | | 10/2004 |
| JP | 2005-216108 A | | 8/2005 |
| JP | 2006-106869 | * | 4/2006 |
| JP | 2006-106869 A | | 4/2006 |

OTHER PUBLICATIONS

Korean Office Action dated Nov. 18, 2009 (3 pages), and English translation thereof (3 pages), issued in counterpart Korean Application Serial No. 10-2008-0053501.
Japanese Office Action dated Mar. 10, 2009 (2 pages), and English translation thereof (4 pages) issued in counterpart Japanese Application No. 2007-151522.

* cited by examiner

*Primary Examiner* — Jesse Pullias
(74) *Attorney, Agent, or Firm* — Holtz, Holtz, Goodman & Chick, PC

(57) ABSTRACT

Disclosed is an electronic dictionary including a plurality of dictionary databases. In a twin retrieval using two dictionaries, a sub-dictionary according to a main dictionary is set besides the main dictionary. When a user inputs a retrieval character string, the electronic dictionary retrieves corresponding headwords from the main dictionary to produce a headword list and displays it. Furthermore, the electronic dictionary displays explanation information pertaining to one headword in the headword list. In addition to this, the electronic dictionary reads the explanation information corresponding to the headword of the main dictionary specified with a cursor from a sub-dictionary database to display the explanation information besides that of the main dictionary. If the specification of a headword of the main dictionary is changed by moving the cursor, then the electronic dictionary re-retrieves the changed headword from the sub-dictionary, and changes the explanation information of the sub-dictionary to display it.

6 Claims, 8 Drawing Sheets

FIG. 3

| HEADWORD | EXPLANATION INFORMATION | IMPORTANCE LEVEL |
|---|---|---|
| ⋮ | ⋮ | ⋮ |
| whatever | 1. [INTERROGATIVE] WHAT ON EARTH ⋯ | 1 |
| ⋮ | ⋮ | ⋮ |

| NAME OF DICTIONARY DB | USE FREQUENCY (RETRIEVAL FREQUENCY) |
|---|---|
| AAA | 1024 |
| BBB | 643 |
| CCC | 345 |
| DDD | 286 |
| EEE | 123 |
| FFF | 80 |
| ⋮ | ⋮ |

~85

ELECTRONIC EQUIPMENT EQUIPPED WITH DICTIONARY FUNCTION

BACKGROUND OF THE INVENTION

1. Field of the Invention

The present invention relates to electronic equipment equipped with a dictionary function.

2. Description of Related Art

Electronic equipment with a dictionary function, which is so-called electronic dictionary, has conventionally been used. The electronic dictionary stores a dictionary database (dictionary information) in its memory, and the dictionary database stores headwords and the explanation information of the headwords in association with each other. The electronic dictionary reads from the dictionary database the explanation information of the headword corresponding to a retrieval character string that a user inputs, so as to display the explanation information.

In recent years, it has been considered to read the explanation information of the headword corresponding to a retrieval character string from a plurality of dictionary databases to display a plurality of pieces of the read explanation information simultaneously in this kind of electronic dictionary as disclosed in, for example, Japanese Patent Application Laid-Open Publication No. 2004-302663.

Now, there is a case where a certain headword is looked up in one dictionary mainly while the same headword is looked up in another dictionary subsidiarily for reference, if a user has a plurality of paper dictionaries.

The electronic dictionary disclosed in Japanese Patent Application Laid-Open Publication No. 2004-302663 can simultaneously read explanation information from the plurality of kinds of dictionary databases to display the read information. However, when a user does a study by letting the dictionary display a plurality of pieces of explanation information in order, and thereafter specifying headwords in the main dictionary database in order by cursor movement after once displaying a piece of explanation information, this electronic dictionary cannot change the display of the explanation information of the headwords in the sub-dictionary database according to the cursor movement.

SUMMARY OF THE INVENTION

It is an object of the present invention to provide electronic equipment with a dictionary function which also can change the display of explanation information based on a sub-dictionary in the case of displaying a plurality of pieces of explanation information in a main dictionary in order by moving a headword specifying cursor in a headword list in main dictionary information.

According to an aspect of the invention, there is provided electronic equipment with a dictionary function comprising: a dictionary storing section to store a plurality of dictionary databases each storing a headword and explanation information associated with the headword; a dictionary setting section to set a main dictionary and a sub-dictionary from the plurality of dictionary databases stored in the dictionary storing section; an input section to input a retrieval character string on a basis of a user's operation; a main dictionary headword list displaying section to generate a headword list on a basis of a dictionary database set as the main dictionary according to the retrieval character string input from the input section to display the headword list; a cursor moving section to move a cursor to specify one of headwords displayed by the main dictionary headword list displaying section on a basis of a user's operation; a main dictionary explanation information displaying section to read explanation information of the headword specified by the cursor moved by the cursor moving section from the dictionary database set as the main dictionary to display the read explanation information in an area different from the headword list; and a sub-dictionary explanation information displaying section to retrieve the headword specified by the cursor from the dictionary database set as the sub-dictionary every movement of the cursor by the cursor moving section, and to read explanation information of the sub-dictionary corresponding to the headword to display the read explanation information in an area different from the area for the explanation information of the main dictionary.

BRIEF DESCRIPTION OF THE DRAWINGS

FIG. 3 is a view showing the structure of a dictionary database, such as an English-Japanese dictionary;

FIG. 4 is a view showing the structure of a dictionary use frequency storing table;

DETAILED DESCRIPTION OF THE PREFERRED EMBODIMENTS

In the following, an embodiment in the case of applying the electronic equipment equipped with a dictionary function according to the present invention to an electronic dictionary will be described in detail with reference to the attached drawings.

The configuration of the electronic dictionary of the present embodiment is first described.

[External Appearance Configuration]

Figure 1:
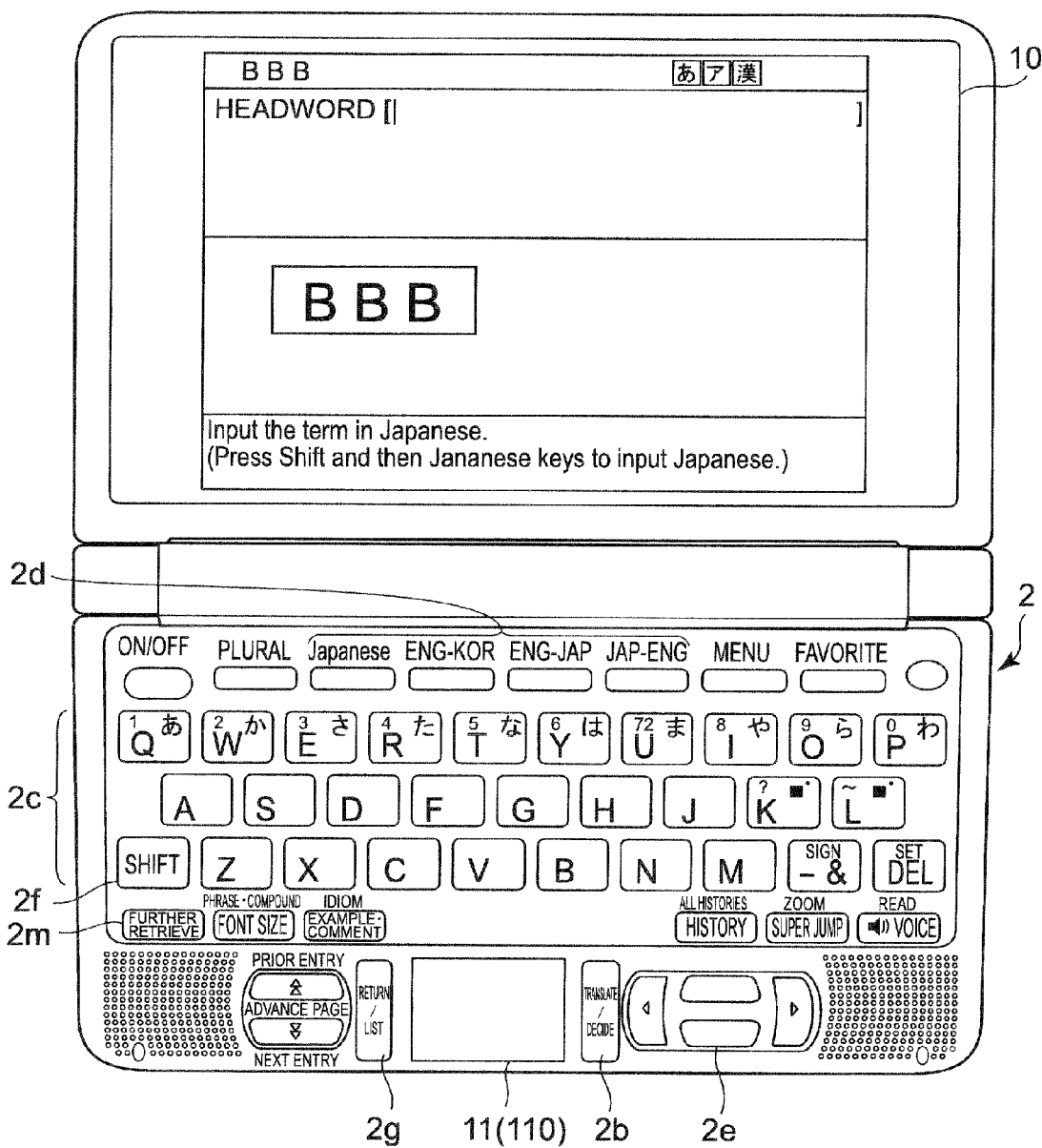
FIG. 1 is a plan view showing an electronic dictionary to which the present invention is applied.

FIG. 1 is a plan view of an electronic dictionary 1.

As shown in this figure, the electronic dictionary 1 is composed of a main display 10, sub-display 11, and a key group 2.

The main display 10 and the sub-display 11 are parts to display various kinds of data, such as a character and a sign according to an operation of the key group 2 by a user, and the main display 10 and the sub-display 11 are each made of a liquid crystal display (LCD), an electronic luminescent display (ELD), or the like. The sub-display 11 of the present embodiment is integrally formed with the so-called touch panel 110 (see FIG. 2), so that an input operation according to a depressed position is enabled by depressing the surface of the touch panel with a pen or a finger.

The key group 2 includes various keys for a user to operate the electronic dictionary 1. To put it concretely, the key group 2 includes a translation/decision key 2b, character keys 2c, dictionary selection keys 2*d*, cursor keys 2*e*, a shift key 2*f*, a return key 2*g*, an additional retrieval key 2*m*, a jump key 2*n*, and the like.

The translation/decision key 2*b* is a key to be used for the execution of retrieval, the decision of a headword, and the like.

The character keys 2*c* are keys to be used for a user to input characters and the like, and include "A" to "Z" keys in the present embodiment.

The dictionary selection keys 2*d* are keys to be used for the selection of dictionary databases 84 (see FIG. 2), which will be described later.

The cursor keys 2*e* are keys to be used for the movement and the like of a highlighted display position, that is, a cursor position, in a screen, and can specify the left, right, top, and bottom positions in the present embodiment.

The shift key 2*f* is a key to be used at the time of setting a Japanese word as a retrieval object, and the like.

The return key 2*g* is a key to be used at the time of returning to the screen displayed at the last time.

The additional retrieval key 2*m* is a key for performing the retrieval in conjunction with the second dictionary databases 84 (hereinafter referred to twin retrieval).

The jump key 2*n* is a key to be used at the time of starting a jump function.

[Internal Configuration]

Figure 2:
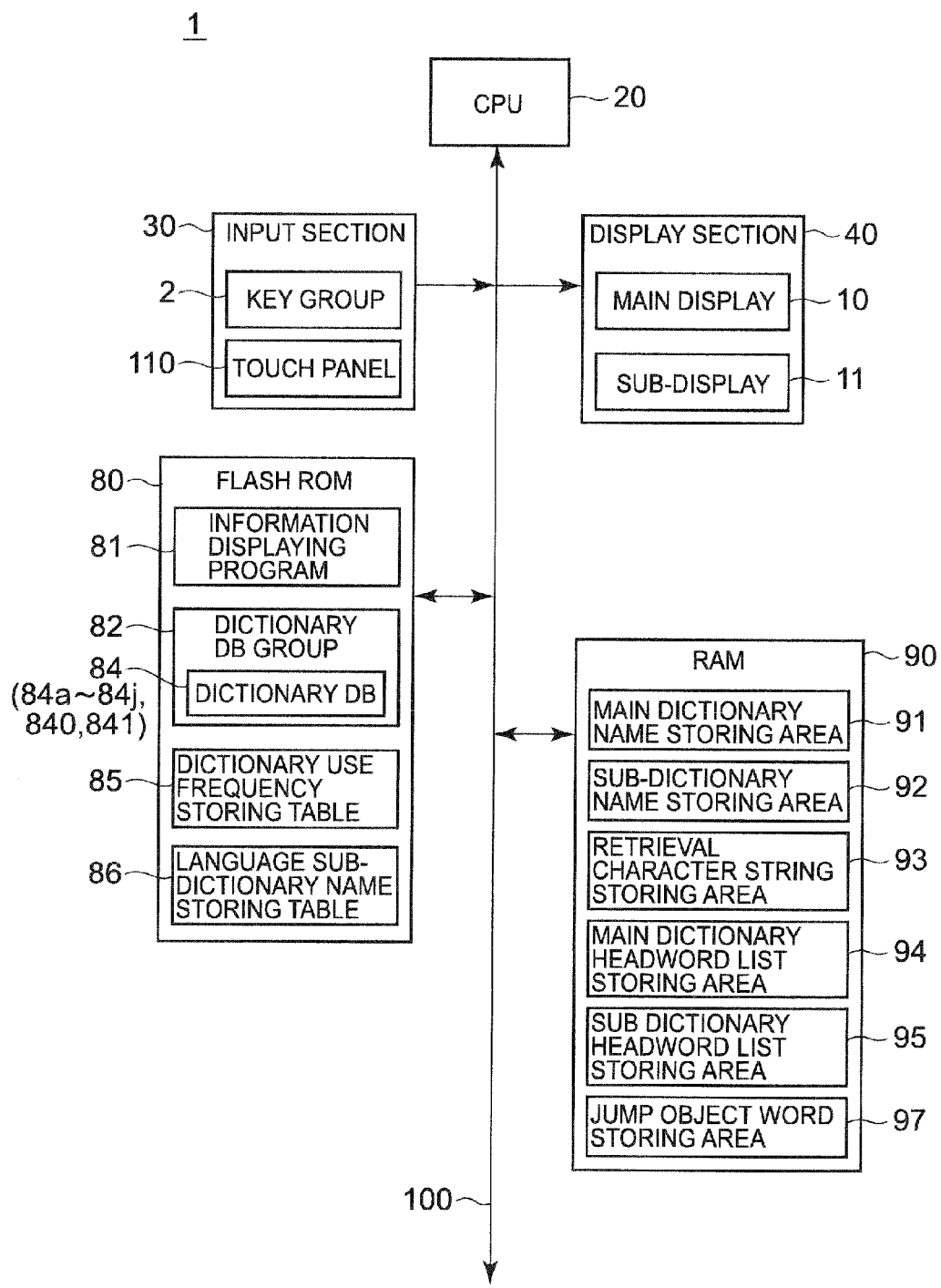
FIG. 2 is a block diagram showing the schematic configuration of the electronic dictionary to which the present invention is applied.

Successively, the internal structure of the electronic dictionary 1 is described. FIG. 2 is a block diagram of the internal configuration of the electronic dictionary 1.

As shown in this figure, the electronic dictionary 1 is composed of a display section 40, an input section 30, a central processing unit (CPU) 20, a flash read only memory (ROM) 80, and a random access memory (RAM) 90, and each section is connected to one another through a bus 100.

The display section 40 is equipped with the aforesaid main display 10 and the sub-display 11, and displays various kinds of information on the main display 10 and the sub-display 11 on the basis of the display signals from the CPU 20.

The input section 30 is equipped with the aforesaid key group 2 and the touch panel 110, and outputs the signals corresponding to a depressed key and a position on the touch panel 110 to the CPU 20.

The CPU 20 executes the processing based on a predetermined program according to an input instruction, and performs the transfer and the like of an instruction and data to each function section to collectively control the electronic dictionary 1. To put it concretely, the CPU 20 reads the various programs stored in the flash ROM 80 according to operation signals input from the input section 30, and executes the processing in accordance with the programs. Then, the CPU 20 saves the processing results in the RAM 90, and suitably outputs the processing results to the display section 40.

The flash ROM 80 is a memory to store the programs and the data for realizing the various functions of the electronic dictionary 1. In the present embodiment, the flash ROM 80 stores an information displaying program 81, a dictionary database group 82, a dictionary use frequency storing table 85, a language sub-dictionary name storing table 86, and the like.

The information displaying program 81 is a program to make the CPU 20 execute dictionary retrieval processing (see FIGS. 5 and 6), which will be described later.

The dictionary database group 82 includes the plurality of kinds of dictionary databases 84. In the present embodiment, the dictionary databases 84 include a dictionary database 84*a* of the English-Japanese dictionary named as "AAA,", a dictionary database 84*b* of a first Japanese-language dictionary named as "BBB," a dictionary database 84*c* of a second Japanese-language dictionary named as "CCC," a dictionary database 84*d* of an English-Korean dictionary named as "DDD," a dictionary database 84*e* of a first English dictionary named as "EEE," a dictionary database 84*f* of a Chinese-Korean dictionary named as "FFF," a dictionary database 84*g* of a second English dictionary named as "GGG," a dictionary database 84*h* of a dictionary of classical Chinese explained in Japanese named as "HHH," a dictionary database 84*i* of a third Japanese-language dictionary named as "III," a dictionary database 84*j* of a Japanese-Korean dictionary named as "JJJ," and the like.

These dictionary databases 84 each stores the explanation information of the semantic content of a headword, and the importance level and the like to indicate the degree of importance of the headword, which associated with the explanation information, to each of a plurality of headwords, as an example shown in FIG. 3. The importance level is divided into four stages from "0" to "3" in the present embodiment here. The smaller the value is, the lower the degree of importance is. Moreover, the values of the importance level are expressed by the number of importance degree marks M1 (see, for example, FIGS. 10A and 10B), which are added to each headword in the dictionary retrieval processing.

The dictionary use frequency storing table 85 stores a use frequency of each of the dictionary databases 84, that is, the retrieval frequency using the dictionary, as shown in FIG. 4.

The language sub-dictionary name storing table 86 stores the identification information (dictionary name) of the dictionary database 84 set as the sub-dictionary 841 of each kind of headword languages. Incidentally, the dictionary names in the language sub-dictionary name storing table 86 are set by a user before the dictionary retrieval processing.

The RAM 90 includes a memory area to temporarily hold the various programs to be executed by the CPU 20, the data and the like pertaining to the execution of the programs. The RAM 90 includes a main dictionary name storing area 91, a sub-dictionary name storing area 92, a retrieval character string storing area 93, a main dictionary headword list storing area 94, a sub dictionary headword list storing area 95, and a jump object word storing area 97 in the present embodiment.

The main dictionary name storing area 91 stores the identification information (dictionary name) of the dictionary database 84 set as a main dictionary 840 in the dictionary retrieval processing.

The sub-dictionary name storing area 92 stores the identification information (dictionary name) of the dictionary database 84 set as the sub-dictionary 841 in the dictionary retrieval processing.

The retrieval character string storing area 93 stores a retrieval character string composed of at least one character, which is input by a user.

The main dictionary headword list storing area 94 stores the listed headwords retrieved from the main dictionary 840 in the dictionary retrieval processing as a main dictionary headword list.

The sub dictionary headword list storing area 95 stores the listed headwords retrieved from the sub-dictionary 841 in the dictionary retrieval processing as a sub-dictionary headword list.

The jump object word storing area 97 stores a jump object word when a jump function is started.

[Operation]

The operation of the electronic dictionary 1 is successively described.

Figure 5:
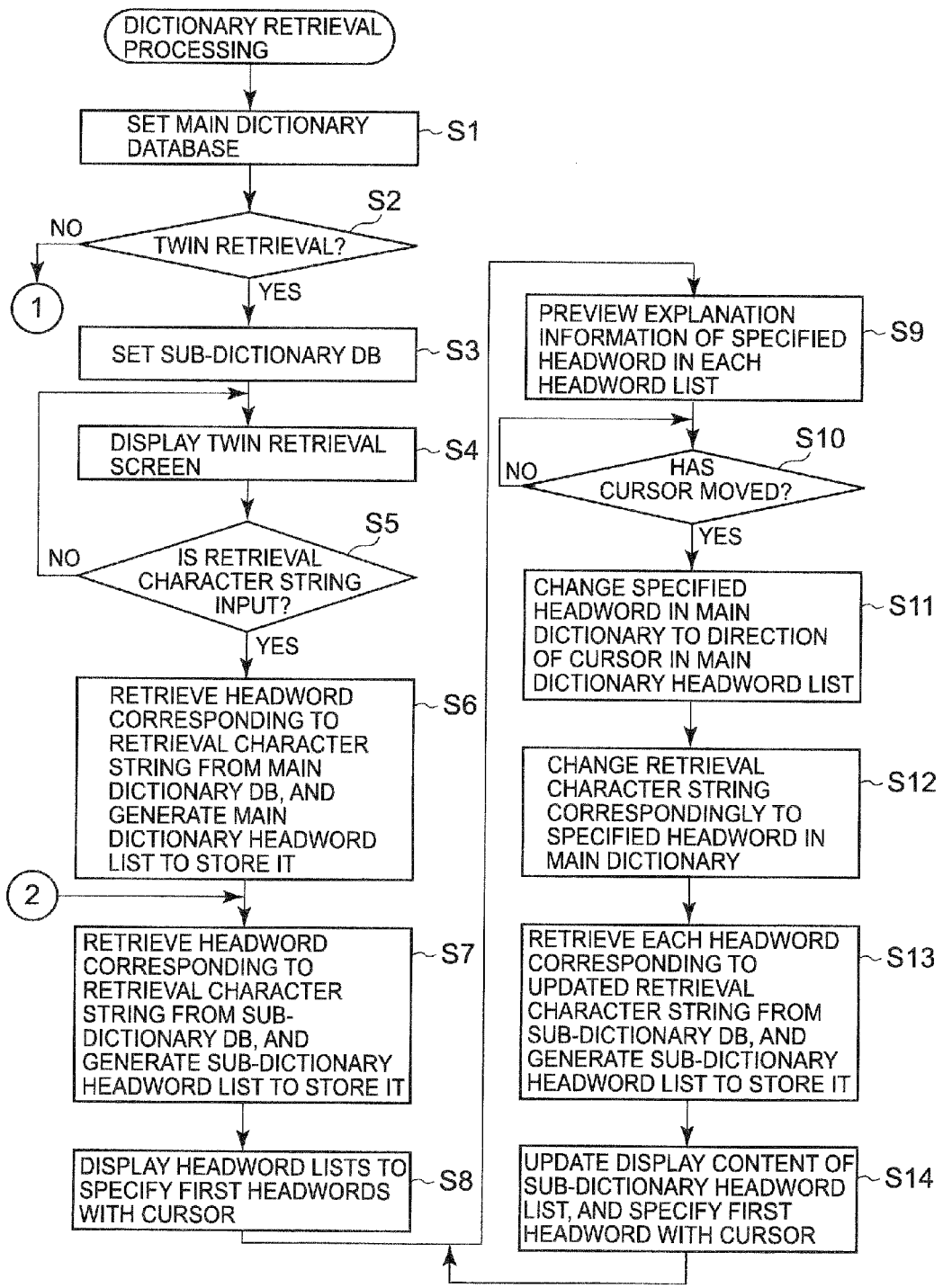
FIG. 5 is a flowchart showing the operation of dictionary retrieval processing.
Figure 6:
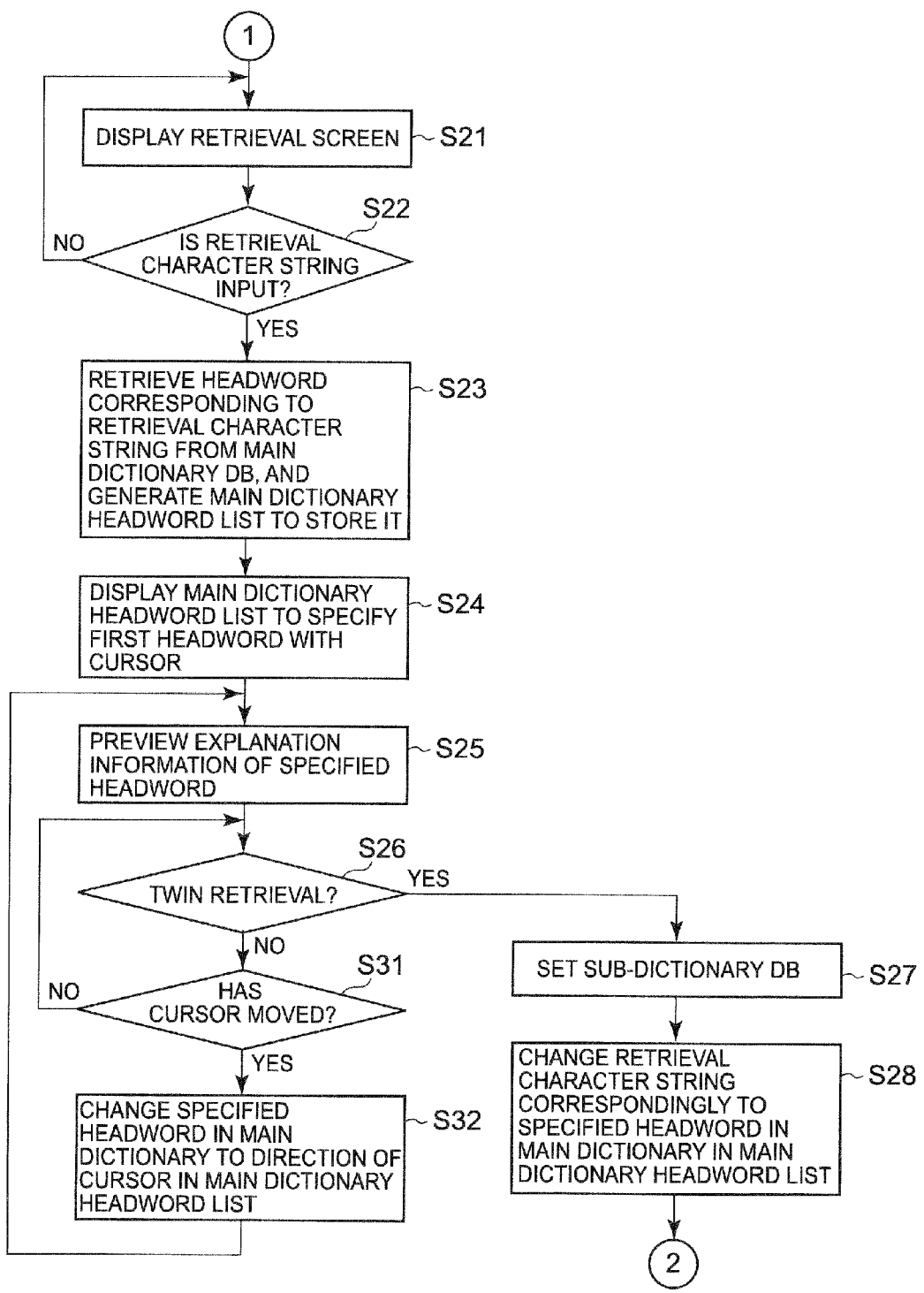
FIG. 6 is a flowchart showing the operation of the dictionary retrieval processing.

FIGS. 5 and 6 are flowcharts showing the flow of the dictionary retrieval processing executed by the CPU 20 by reading the information displaying program 81.

First, as shown in FIG. 5, when a user depresses any one of the dictionary selection keys 2d to select one of the dictionary databases 84, the CPU 20 stores the selected dictionary name into the main dictionary name storing area 91, and sets the dictionary database as the main dictionary 840 (Step S1).

Next, the CPU 20 judges whether the twin retrieval is instructed by the user or not, that is, whether the additional retrieval key 2m is operated or not (Step S2).

At Step S2, if the CPU 20 judges that the twin retrieval is instructed (Step S2; Yes), the CPU 20 specifies one dictionary database among the dictionary databases 84 according to the kind of the main dictionary 840 by a method that will be described later, and stores the dictionary name in the sub-dictionary name storing area 92 to perform the setting of the sub-dictionary (Step S3).

Figure 7A:
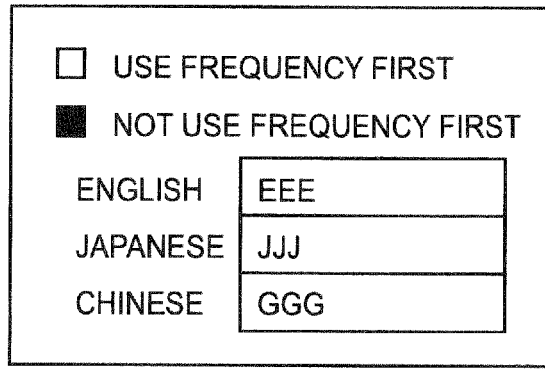
FIGS. 7A, 7B, 7C, and 7D are views showing display content in the dictionary retrieval processing.

In the sub-dictionary setting processing at Step S3, the CPU 20 displays the screen shown in FIG. 7A in the sub-display 11 to allow the user to select whether to use the use frequency of the dictionary data base 84 or not for the setting of the sub-dictionary. If the user selects the use of the use frequency, then the CPU 20 sets a dictionary database 84 that has the largest use frequency and is different from the main dictionary 840 as the sub-dictionary 841 among the dictionary databases 84 having the headwords of the same language as that of the main dictionary 840 on the basis of the information in the dictionary use frequency storing table 85.

On the other hand, if the user selects the disuse of the use frequency, then the CPU 20 sets the dictionary database 84 corresponding to the headword language (the language of the retrieval character string input at Step S5 described below) of the main dictionary 840 as the sub-dictionary 841 on the basis of the information in the language sub-dictionary name storing table 86. FIG. 7A shows a display example of displaying the content of the language sub-dictionary name storing table 86 on the basis of the selection of disuse of the use frequency. In this case, it is shown that, if the language of a headword is English, then the dictionary "EEE" is selected; that, if the language is Japanese, then the dictionary "JJJ" is selected; and that, if the language is Chinese, then the dictionary "GGG" is set.

When the sub-dictionary is set, the CPU 20 next displays a twin retrieval screen in which the dictionary names of the main dictionary 840 and the sub-dictionary 841 and an entry field of a retrieval character string corresponding to the main dictionary 840 on the main display 10 (Step S4).

Figure 7B:
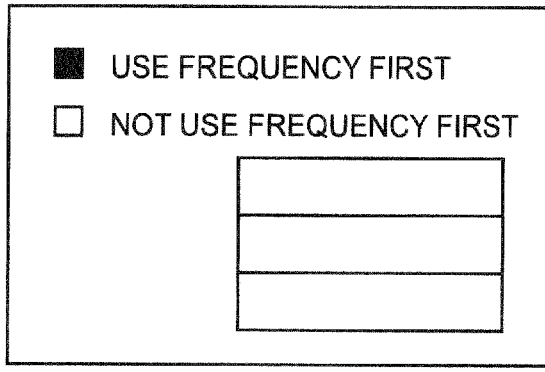
Figure 7C:
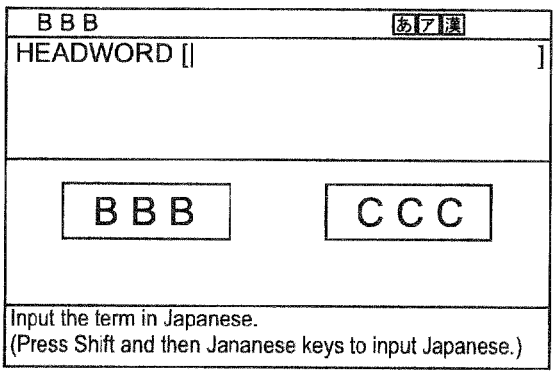
Figure 7D:
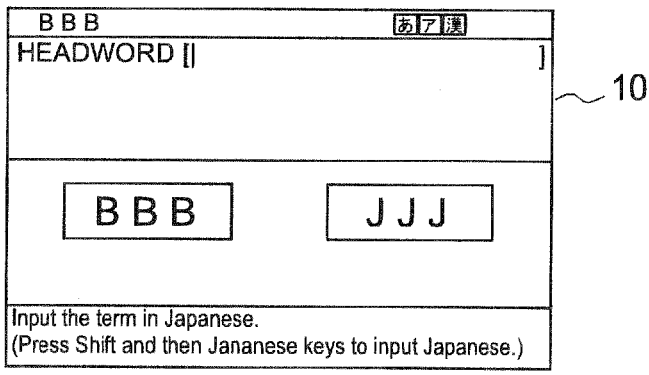

Thereby, if the user selects the disuse of the use frequency as shown in FIG. 7A in the state in which, for example, the dictionary database 84b of the Japanese-language dictionary "BBB" (the first Japanese-language dictionary) is selected as the main dictionary 840, then the dictionary database 84j of the Japanese-Korean dictionary "JJJ" is set as the sub-dictionary 841 on the basis of the information in the language sub-dictionary name storing table 86, and the twin retrieval screen shown in FIG. 7D is displayed. On the other hand, if the user selects the use of the use frequency as shown in FIG. 7B, the dictionary database 84c of the Japanese-language dictionary "CCC" (the second Japanese-language dictionary) is set as the sub-dictionary 841 in accordance with the content of the dictionary use frequency storing table 85, and the twin retrieval screen as shown in FIG. 7C is displayed.

When the twin retrieval screen has displayed, the CPU 20 next judges whether a retrieval character string is input or not (Step S5) If the CPU 20 judges that no retrieval character strings are input (Step S5; No), then the CPU 20 moves its processing to that at Step S4 mentioned above.

If the CPU 20 judges that a retrieval character string is input at Step S5 (Step S5; Yes), then the CPU 20 stores the input retrieval character string into the retrieval character string storing area 93, following which the CPU 20 retrieves the headword corresponding to the retrieval character string from the main dictionary 840. Then, the CPU 20 generates a main dictionary headword list to store the generated main dictionary headword list into the main dictionary headword list storing area 94 (Step S6). Incidentally, the generation of a headword list is performed by retrieving the headword to accord with the retrieval character string in prefix from a dictionary database and by reading a predetermined number of headwords following the retrieved headword in the alphabetic order or the Japanese syllabary order from the dictionary database in the present embodiment.

Next, the CPU 20 retrieves the headword corresponding to the retrieval character string from the sub-dictionary 841, and generates a sub-dictionary headword list to store the generated sub-dictionary headword list into the sub dictionary headword list storing area 95 (Step S7).

Next, the CPU 20 displays the main dictionary headword list and the sub-dictionary headword list on the main display 10, and specifies a first headword in each of the headword lists with a cursor (Step S8). Then, the CPU 20 reads the explanation information of the headword specified with the cursor in the main dictionary headword list (hereinafter referred to as a main headword) from the main dictionary 840 to preview the explanation. Moreover, the CPU 20 reads the explanation information of the headword specified with the cursor in the sub-dictionary headword list (hereinafter referred to as a sub-headword) from the sub-dictionary 841 to preview the explanation (Step S9). Thereby the content of the two dictionaries is displayed, and the twin retrieval ends.

Figure 8A:
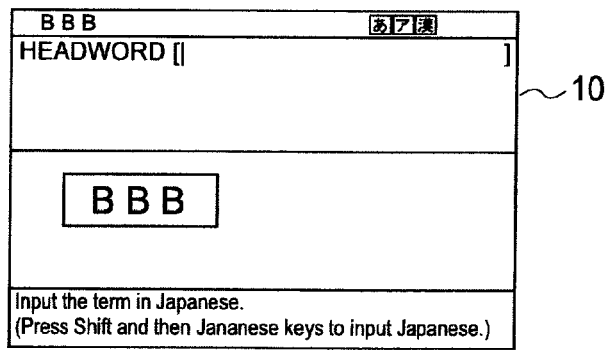
FIGS. 8A, 8B, 8C, and 8D are views showing display content in the dictionary retrieval processing.
Figure 8B:
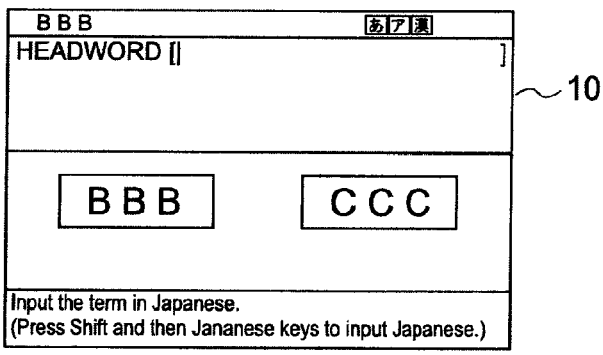
Figure 8C:
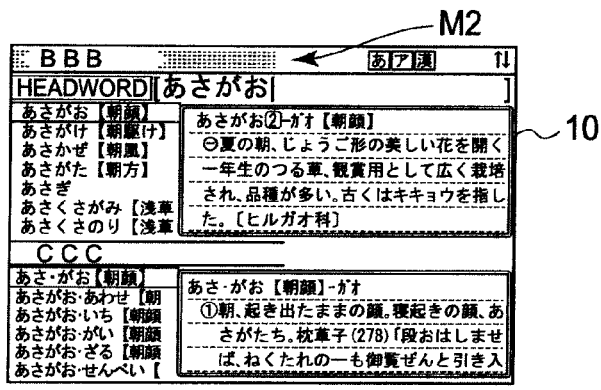
Figure 8D:
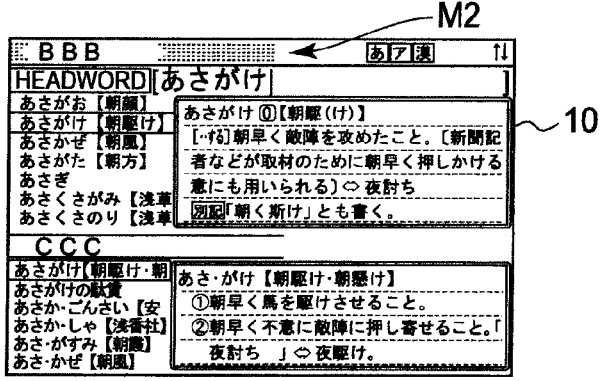

Incidentally, in the present embodiment, the CPU 20 displays an identification mark M2 beside the dictionary name in the information display area of the main dictionary 840 for distinguishing the information display area of the main dictionary 840 from that of the sub-dictionary 841 in the display processing at Step S9 (see FIGS. 8C and 8D).

When the twin retrieval display has performed, the CPU 20 next judges whether the user operates the cursor keys 2e or not (Step S10). If the CPU 20 judges that the cursor keys 2e are not operated (Step S10; No), then the CPU 20 moves its processing to that at Step S10.

If the CPU 20 judges that the cursor keys 2e are operated at Step S10 (Step S10; Yes), then the CPU 20 moves the cursor to specify the main headword into the instructed direction, and changes the main headword (Step S11). Moreover, the CPU 20 changes the retrieval character string in the retrieval character string storing area 93 correspondingly to the main headword after the change (Step S12). Incidentally, the changing of the retrieval character string correspondingly to the main headword specifically means to set the character string constituting the main headword as the retrieval character string.

Next, the CPU 20 retrieves the headwords corresponding to the retrieval character string after the change from the sub-dictionary 841, and generates a sub-dictionary headword list to store the generated sub-dictionary headword into the sub dictionary headword list storing area 95 (Step S13). Then, the CPU 20 updates the sub-dictionary headword list on the main display 10, and specifies a first headword in the sub-dictionary headword list after the update with the cursor as the sub-headword (Step S14).

After the processing at Step S14, the processing returns to that at Step S9, and the CPU 20 reads the explanation information of the main headword changed at Step S11 from the main dictionary 840. Moreover, the CPU 20 reads the explanation information of the sub-headword changed at Step S14 from the sub-dictionary 841, and previews them.

In this manner, when any one of the headwords in a main dictionary headword list is specified as a main headword by a user's operation, the explanation information of the main headword is read from the main dictionary 840 to be previewed, and the headword corresponding to the main headword is retrieved from the sub-dictionary 841 to be set as a sub-headword. Then, the explanation information of the sub-headword is read from the sub-dictionary information to be previewed. Thus, whenever the main headword is changed by a movement of the cursor, the explanation information of the main headword after the change and the explanation information of the sub-headword corresponding to the main headword after the change are previewed.

On the other hand, if the CPU 20 judges that the twin retrieval is not instructed at Step S2 mentioned above (Step S2; No), then the CPU 20 moves its processing to that shown by the flowchart of FIG. 6. That is, if the twin retrieval is not instructed, then the CPU 20 displays a normal retrieval screen in which the dictionary name of the main dictionary 840 and an entry field of a retrieval character string corresponding to the main dictionary 840 on the main display 10 on the basis of the information in the main dictionary name storing area 91 (Step S21).

The CPU 20 next judges whether a retrieval character string is input or not (Step S22). If the CPU 20 judges that no retrieval character strings are input (Step S5; No), then the CPU 20 moves its processing to that at Step S21 mentioned above.

Moreover, if the CPU 20 judges that a retrieval character string is input at Step S22 (Step S22; Yes), then CPU 20 stores the input retrieval character string into the retrieval character string storing area 93, following which the CPU 20 retrieves the headword corresponding to the retrieval character string from the main dictionary 840. Then, the CPU 20 generates a main dictionary headword list to store the generated main dictionary headword list into the main dictionary headword list storing area 94 (Step S23).

Next, the CPU 20 displays the main dictionary headword list on the main display 10, and specifies the first headword in the main dictionary headword list as a main headword with a cursor (Step S24). Then, the CPU 20 reads the explanation information of the main headword from the main dictionary 840 to preview the explanation in an area different from that of the headword list (Step S25). After the preview, the CPU 20 next judges whether the user instructs the twin retrieval or not, that is, whether the user operates the additional retrieval key 2m or not (Step S26).

In this state, if the user operates the additional retrieval key 2m, then the CPU 20 judges that the twin retrieval is instructed (Step S26; Yes), and the CPU 20 stores a dictionary name among the dictionary databases 84 into the sub-dictionary name storing area 92 to set the dictionary name as the sub-dictionary 841, similarly to the processing at Step S3 mentioned above (Step S27). Then, the CPU 20 changes the retrieval character string in the retrieval character string storing area 93 correspondingly to the main headword in the main dictionary headword list (Step S28). After that, the CPU 20 moves its processing to that at Step S7 in FIG. 5.

Thereby, if the twin retrieval is instructed in the state in which the explanation information of the main headword is displayed, then the headword corresponding to the main headword at the present time is retrieved from the sub-dictionary 841 to be set as the sub-headword, and the explanation information of the sub-headword is read from the sub-dictionary 841 to be previewed.

Incidentally, the processing at Step S26 mentioned above may be adapted so that the twin retrieval is instructed by the operation of the dictionary selection keys 2d.

On the other hand, if the CPU 20 judges that the twin retrieval is not instructed at Step S26 (Step S26; No), then the CPU 20 judges whether the user operates the cursor keys 2e or not (Step S31) If the CPU 20 judges that the user does not operate the cursor keys 2e (Step S31; No), the CPU 20 moves its processing to that at Step S26.

Moreover, if the CPU 20 judges that the user operates the cursor keys 2e at Step S31 (Step S31; Yes), then the CPU 20 changes the main headword to the cursor direction in the main dictionary headword list to specify another main headword (Step S32), and moves its processing to that at Step S25 mentioned above.

Incidentally, if the user operates the translation/decision key 2b in the state in which the explanation information of the main headword is previewed at Steps S9 and S25 mentioned above, then the CPU 20 displays the explanation information of the main headword in the main dictionary 840 over the whole screen of the main display 10.

Moreover, if the user operates the shift key 2f and the up and down keys of the cursor keys 2e in the state in which the main dictionary headword list and the sub-dictionary headword list are displayed at Steps S8 and S9 mentioned above, the CPU 20 is adapted to change the main dictionary and the sub-dictionary.

After the changing of the dictionaries, the display of the new sub-dictionary is altered according to the cursor movement of the main headwords by moving the cursor in the main dictionary headword list of the new main dictionary.

OPERATION EXAMPLE

Successively, the aforesaid dictionary retrieval processing is concretely described with reference to display screen examples.

First Operation Example

First, as shown in FIG. 8A, the dictionary database 84b of the Japanese-language dictionary "BBB" (the first Japanese-language dictionary) is selected as the main dictionary 840 by the operation of the dictionary selection keys 2d (Step S1). Then, if the additional retrieval key 2m is operated (Step S2; Yes), the dictionary database 84c of the Japanese-language dictionary "CCC" (the second Japanese-language dictionary) is set as the sub-dictionary 841 on the basis of the information in the dictionary use frequency storing table 85 or the language sub-dictionary name storing table 86 (Step S3), and a twin retrieval screen including the dictionary names of the Japanese-language dictionaries "BBB" and "CCC" and the entry field of a retrieval character string corresponding to the Japanese-language dictionary "BBB" (main dictionary 840) is displayed on the main display 10 as shown in FIG. 8B (Step S4).

Next, when the user inputs a retrieval character string " "あさがお(asagao)" (Step S5; Yes), each headword corresponding to the retrieval character string " "あさがお""

is severally retrieved from the main dictionary 840 and the sub-dictionary 841 (Steps S6 and S7), and a main dictionary headword list "("あさがお (asagao)," ""あさがけ (asagake)," . . . ) and a sub-dictionary headword list (""あさがお (asagao)," ""あ さがお-あわせ(asagao-awase)," . . . ) are severally displayed on the main display 10 as shown in FIG. 8C. In addition to this, the main dictionary name and the identification mark M are displayed in the vicinity of the main dictionary headword list. Moreover, the first headword (""あさがお (asagao)") in each of the headword lists is specified by a cursor (Step S8), and the explanation information thereof is previewed in an area (the area on the right side) different from that of the headword list is previewed (Step S9).

Next, as shown in FIG. 8D, when the user operates the cursor keys 2e (Step S10; Yes), the cursors are moved to the specified direction (Step S11), and the main headword ""あさがけ"" that is newly specified by the cursors replaces as the retrieval character string (Step S12).

Then, each headword corresponding to the retrieval character string ""あさがけ (asagake)" after the change is retrieved from the sub-dictionary 841 (Step S13), and the sub-dictionary headword list on the main display 10 is updated. Then, the first headword "あさがけ"in the sub-dictionary headword list (""あさがけ (asagake)," ""朝駆けの駄賃 (asagakenodachin)," . . . ) after the update are specified as the sub-headword with the cursor (Step S14). Moreover, the explanation information of the specified headword ""あさがけ (asagake)" in the main dictionary headword list and the explanation information of the specified headword ""あさがけ (asagake)" in the sub-dictionary headword list are read from the main dictionary 840 and the sub-dictionary 841, respectively, and are previewed in the areas (areas on the right side) severally different from areas of the headword lists (Step S9).

Thereby, as shown in FIG. 8D, the headwords between ""あさがお(asagao)" and ""あさがけ (asagake)" in the sub-dictionary headword list, that is, the headwords that are not stored in the main dictionary 840 but stored only in the sub-dictionary 841, are skipped, and the explanation information of ""あさがけ (asagake)" in the sub-dictionary 841 is in the sate of being previewed.

Figure 9A:
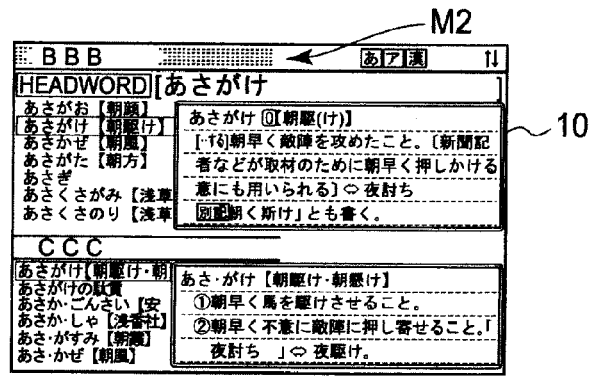
FIGS. 9A and 9B are views showing display content in the dictionary retrieval processing.
Figure 9B:
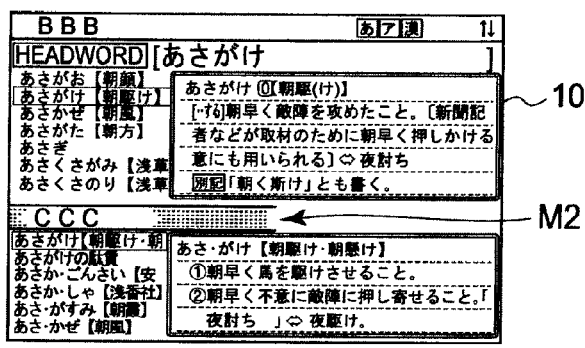

Next, when the user operates the shift key 2f and the up and down keys of the cursor keys 2e in the state shown in FIG. 8D, the main dictionary and the sub-dictionary are changed as shown in FIGS. 9A and 9B, and the identification mark M2 is displayed in the main dictionary after the change. Thereby, when the user operates the cursor keys 2e (Step S10; Yes), the cursor to specify the main headword after the change in the main dictionary headword list after the change is moved (Step S11), and the display of the sub-dictionary is also changed (Steps S12-S14).

Second Operation Example

First, if the additional retrieval key 2m is not operated (Step S2; No) after the dictionary database 84d of the English-Korean dictionary has been selected as the main dictionary 840 by the operation of the dictionary selection keys 2d (Step S1), then the dictionary name of the main dictionary 840 and the entry field of the retrieval character string corresponding to the main dictionary 840 are displayed on the main display 10 as the normal retrieval screen (Step S21).

Figure 10A:
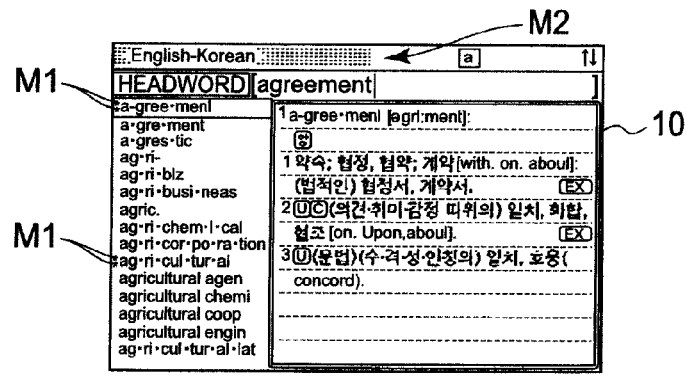
FIGS. 10A and 10B are views showing display content in the dictionary retrieval processing.

Next, as shown in FIG. 10A, if the user inputs a retrieval character string "agreement" (Step S2; Yes), then the retrieval character string "agreement" is stored in the retrieval character string storing area 93, following which each headword corresponding to the retrieval character string "agreement" is retrieved from the main dictionary 840 to be stored in the main dictionary headword list storing area 94 as a main dictionary headword list (Step S23).

Next, the main dictionary headword list ("agreement," "agreement," . . . ) as displayed on the main display 10, and the first headword "agreement" is specified as the main headword with a cursor (Step S24). Then, the explanation information of the main headword is read from the main dictionary 840 to be previewed (Step S25).

Next, when the user operates the additional retrieval key 2m (Step S26; Yes), the dictionary database 84g of the English dictionary "GGG," is set as the sub-dictionary 841 on the basis of the information in the dictionary use frequency storing table 85 or the language sub-dictionary name storing table 86 (Step S27), following which the main headword "agreement" in the main dictionary headword list is changed as the retrieval character string (Step S28).

Figure 10B:
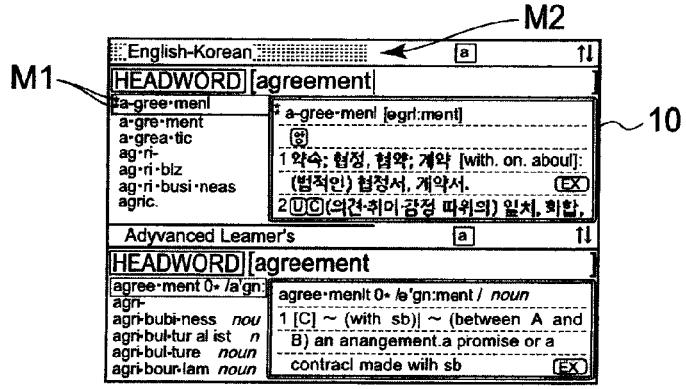

Then, as shown in FIG. 10B, each headword corresponding to the retrieval character string "agreement" after the change is retrieved from the sub-dictionary 841 (Step S7), and the main dictionary headword list and the sub-dictionary headword list are displayed on the main display 10. The first headword "agreement" of each headword list is specified as the main headword and the sub-headword, respectively, with a cursor (Step S8), and the explanation information of the main headword and the explanation information of the sub-headword are read from the main dictionary 840 and the sub-dictionary 841, respectively, to be severally previewed in areas different from those of the headword lists (Step S9).

Incidentally, the embodiments to which the present invention can be applied are not limited to the embodiment described above, and the embodiment can suitably be changed without departing from the spirit of the present invention.

For example, although the information display apparatus according to the present invention has been described as the electronic dictionary 1, the products to which the present invention can be applied are not limited to this one, but the present invention can be applied to the whole electronic equipment such as a cellular phone and a personal computer. Moreover, the information displaying program 81 may be stored in a memory card, a compact disc (CD), and the like, which can be attached to and detached from the electronic dictionary 1.

Moreover, although the CPU 20 is described to change the main headword in the main dictionary headword list to the cursor direction at Step S11, the main headword may be changed in main dictionary headword list to the cursor direction only to the headwords fitted to the importance level set through a setting screen of the importance levels of the headwords, which is displayed on the sub-display 11.

What is claimed is:

1. An information displaying apparatus comprising:
   a main dictionary storing section to store main dictionary information in which words to be studied are associated with respective explanation information;
   a sub-dictionary storing section to store sub-dictionary information in which words to be studied are associated with respective explanation information;
   a displaying section including a retrieval character input area, a word list displaying area to display word lists of the words to be studied respectively retrieved from the main dictionary information and the sub-dictionary information regarding a retrieval character, and an explanation information displaying area to display respective explanation information of the main dictionary information and the sub-dictionary information regarding words specified from the respective word lists displayed in the word list displaying area;

a main word changing section to change a main dictionary specified word by specification of one of the words from the main dictionary word list displayed in the word list displaying area, the specification being made according to a user operation;

a sub-dictionary word update displaying section to retrieve the changed main dictionary specified word as a new retrieval character from the sub-dictionary information and to update display of the sub-dictionary word list in the word list displaying area;

a sub-word respecifying section to specify a first word in the updated display of the sub-dictionary word list as a sub-dictionary specified word, wherein the first word is the same as the changed main dictionary specified word, and is listed first in the sub-dictionary word list by skipping each word stored only in the sub-dictionary information in the sub-dictionary word list between the word in the sub-dictionary word list corresponding to the main dictionary specified word before the change and the word in the sub-dictionary word list corresponding the main dictionary specified word after the change; and an explanation information update displaying section to update display of the explanation information to display explanation information of the changed main dictionary specified word and explanation information of the sub-dictionary specified word, which is the same as the changed main dictionary specified word and is listed first in the sub-dictionary word list, in the explanation information displaying area.

2. The information displaying apparatus according to claim 1, further comprising:

a switching section to respectively switch the main-dictionary word list with the sub-dictionary word list and the main dictionary information with the sub-dictionary information according to a user operation, in a state in which the word lists respectively retrieved from the main dictionary information and the sub-dictionary information are displayed in the word list displaying area;

wherein when the switching section respectively switches the main-dictionary word list with the sub-dictionary word list and the main dictionary information with the sub-dictionary information according to a user operation:

the main word changing section changes the main dictionary specified word by specification of one of the words from the main dictionary word list after the switching, the specification being made according to a user operation;

the sub-dictionary word update displaying section retrieves the changed main dictionary specified word as a new retrieval character from the sub-dictionary information after the switching and updates display of the sub-dictionary word list in the word displaying area;

the sub-word respecifying section specifies a first word in the updated display of the sub-dictionary word list as a sub-dictionary specified word; and the explanation information update displaying section updates display of respective explanation information of the main dictionary specified word and the sub-dictionary specified word of the main dictionary information and the sub-dictionary information after the switching in the explanation information displaying area.

3. The information displaying apparatus according to claim 1, further comprising a main dictionary word identification displaying section to display a mark to identify a main dictionary word, wherein the mark is displayed near the main dictionary word list in the word list displaying area.

4. The information displaying apparatus according to claim 1, wherein the main word changing section changes the main dictionary specified word by specification of one of the displayed words from the main dictionary word list displayed in the word list displaying area, the specification being made by operation of a cursor; and wherein the information displaying apparatus further comprises a retrieval character update displaying section to update display of a word in the retrieval character input area when the main dictionary specified word is changed by the main word changing section.

5. The information displaying apparatus according to claim 1, further comprising a plural dictionary retrieval setting section to set whether or not to use the sub-dictionary information together with the main dictionary information according to a user operation.

6. A non-transitory computer readable storage medium storing an information displaying program to control a computer to perform functions comprising:

storing main dictionary information in which words to be studied are associated with respective explanation information;

storing sub-dictionary information in which words to be studied are associated with respective explanation information;

setting in a displaying device of the computer a retrieval character input area, a word list displaying area to display word lists of the words to be studied respectively retrieved from the main dictionary information and the sub-dictionary information regarding a retrieval character, and an explanation information displaying area to display respective explanation information of the main dictionary information and the sub-dictionary information regarding words specified from the respective word lists displayed in the word list displaying area;

changing a main dictionary specified word by specification of one of the words from the main dictionary word list displayed in the word list displaying area, the specification being made according to a user operation;

retrieving the changed main dictionary specified word as a new retrieval character from the sub-dictionary information and updating display of the sub-dictionary word list in the word list displaying area;

specifying a first word in the updated display of the sub-dictionary word list as a sub-dictionary specified word, wherein the first word is the same as the changed main dictionary specified word, and is listed first in the sub-dictionary word list by skipping each word stored only in the sub-dictionary information in the sub-dictionary word list between the word in the sub-dictionary word list corresponding to the main dictionary specified word before the change and the word in the sub-dictionary word list corresponding the main dictionary specified word after the change; and updating display of the explanation information to display explanation information of the changed main dictionary specified word and explanation information of the sub-dictionary specified word, which is the same as the changed main dictionary specified word and is listed first in the sub-dictionary word list, in the explanation information displaying area.

* * * * *